United States Patent [19]

Gilmore

[11] 4,338,744
[45] Jul. 13, 1982

[54] SAFETY SYSTEM FOR WEED DESTROYING APPARATUS

[75] Inventor: Thomas P. Gilmore, Wauwatosa, Wis.

[73] Assignee: Allis-Chalmers Corporation, Milwaukee, Wis.

[21] Appl. No.: 243,841

[22] Filed: Mar. 16, 1981

[51] Int. Cl.³ .......................................... A01M 21/00
[52] U.S. Cl. ........................................................ 47/1.3
[58] Field of Search ........................................ 47/1.3

[56] References Cited

U.S. PATENT DOCUMENTS

3,919,806 11/1975 Pluenneke et al. ................... 47/1.3
4,177,603 12/1979 Dykes ..................................... 47/1.3
4,198,781 4/1980 Dykes ..................................... 47/1.3

Primary Examiner—Robert E. Bagwill
Attorney, Agent, or Firm—Lee H. Kaiser

[57] ABSTRACT

A weed destroying system carried on a vehicle and having electrodes for contacting weeds and a high voltage generator and a step-up transformer for supplying high voltage to the electrodes is provided with a tamper-proof safety system having redundant safety interlocks to effectively ground the vehicle and redundant safety interlocks to prevent energization of the generator until the vehicle is traveling at a predetermined speed and which de-energizes the generator if any one safety interlock is bypassed or fails in an unsafe condition, thereby requiring plural simultaneous failures to create a condition that is hazardous to the operator or to a bystander. The safety system also provides immediately-visible warning of the electrical hazard created by the apparatus and provides visual and aural indications to the operator when a safety interlock has been bypassed or is jammed closed.

29 Claims, 16 Drawing Figures

SAFETY SYSTEM FOR WEED DESTROYING APPARATUS

This invention relates to electroculture and in particular to apparatus for destroying weeds in and around crop rows by application of electricity thereto.

BACKGROUND OF THE INVENTION

Electrical apparatus for destroying weeds is disclosed in such patents as U.S. Pat. No. 3,919,806 wherein a source of high voltage electricity is carried on a vehicle having a sharp-edge metallic ground contact wheel, or coulter, for connecting the low side of the high voltage source to the ground, and electrodes carried on the vehicle and connected to the high side of the voltage source are positioned to contact the weeds to transfer electrical current thereto to kill the weeds. The high voltage source may comprise an electrical generator driven by the power take-off shaft of the tractor pulling the vehicle and a transformer for stepping up the generator voltage. Grounding and safety features are provided to prevent the high voltage from harming the vehicle operator or bystanders. Specifically, U.S. Pat. No. 3,919,806 discloses four normally open interlock switches connected in series which must be closed in order to energize the transformer, and such interlock switches are controlled by respectively: (a) the transformer cover which must be closed; (b) the ground contact wheel which must be in position to penetrate the ground; (c) the "run" switch which is manually held by the operator and (d) means to indicate that the vehicle is travelling above a predetermined speed.

Such safety features substantially reduce hazards to the operator and bystanders, but the interlocks are not tamper-proof, can easily be disabled, and do not provide optimum reliability. Failure of a single interlock can result in a hazardous condition of the weed destroying apparatus. Also, such known weed killing apparatus does not have immediately-visible warning of the electrical hazard. If the coulter interlock switch is jammed closed, the high voltage source may be energized while the vehicle is at rest, and this presents a hazard to bystanders, and also to the vehicle operator since loss of ground contact can cause the vehicle or the tractor to assume the high potential at the output side of the transformer. Still further, even when all interlocks are operating satisfactorily and the vehicle is at rest, the residual generator voltage is applied to the primary side of the transformer and the voltage produced in the secondary is still high enough to create a hazard.

OBJECTS OF THE INVENTION

It is an object of the invention to provide an improved safety system for electrical weed destroying apparatus which protects the vehicle operator under all operating conditions and reduces hazards to bystanders to the extent that such weed destroying apparatus is no more dangerous than other types of farm equipment.

Another object of the invention is to provide such an improved safety system for electrical weed destroying apparatus which is tamper-proof. Still another object is to provide such an improved safety system wherein all protective systems fail safe or require plural simultaneous failures to create a condition that is hazardous to the operator or to a bystander.

A still further object of the invention is to provide an improved safety system for electrical weed killing apparatus which uses electrical logic means to increase the reliability and reduce the cost and complexity of the safety system.

Another object is to provide improved safety apparatus for electrical weed destroying apparatus which uses redundant interlock means to prevent unsafe conditions wherein the high voltage source could be a hazard to the vehicle operator or to bystanders, a programmable semiconductor logic array, sensors means for providing binary input signals to said logic array indicative of whether the interlock means is in the safe or unsafe condition, and wherein the logic array is programmed to prevent energization of the high voltage source if the binary input signals indicate that any interlock means is jammed or has failed in the unsafe condition.

Another object is to provide an improved safety system for electrical weed destroying apparatus which provides immediately-visible warning of the electrical hazard created by the apparatus and also provides visual and aural indications to the operator when a safety interlock has been bypassed or is jammed closed. A still further object is to provide an improved safety system for electrical weed killing apparatus which uses redundant safety interlocks to effectively ground the vehicle and to prevent energization of the high voltage source until the vehicle is traveling at a predetermined speed and which de-energizes the voltage source if any one safety interlock is by-passed or fails in an unsafe condition.

DESCRIPTION OF THE DRAWINGS

These and other objects and advantages of the invention will be more readily apparent from the consideration of the following detailed description when taken together with the accompanying drawing wherein.

DETAILED DESCRIPTION

Weed destroying apparatus embodying the invention may be carried on a vehicle pulled by a tractor through a field so that the conductive electrodes E (shown in FIG. 1c) contact the weeds to be destroyed, as disclosed in aforementioned U.S. Pat. No. 3,919,806, or alternatively the apparatus may be mounted on the three point hitch of a tractor, and inasmuch as such mounting of the weed destroying apparatus and the electrodes E for contacting the weeds does not constitute part of the present invention, such mounting is omitted from the drawing in order to simplify the description and facilitate understanding of the invention.

Figure 1A:
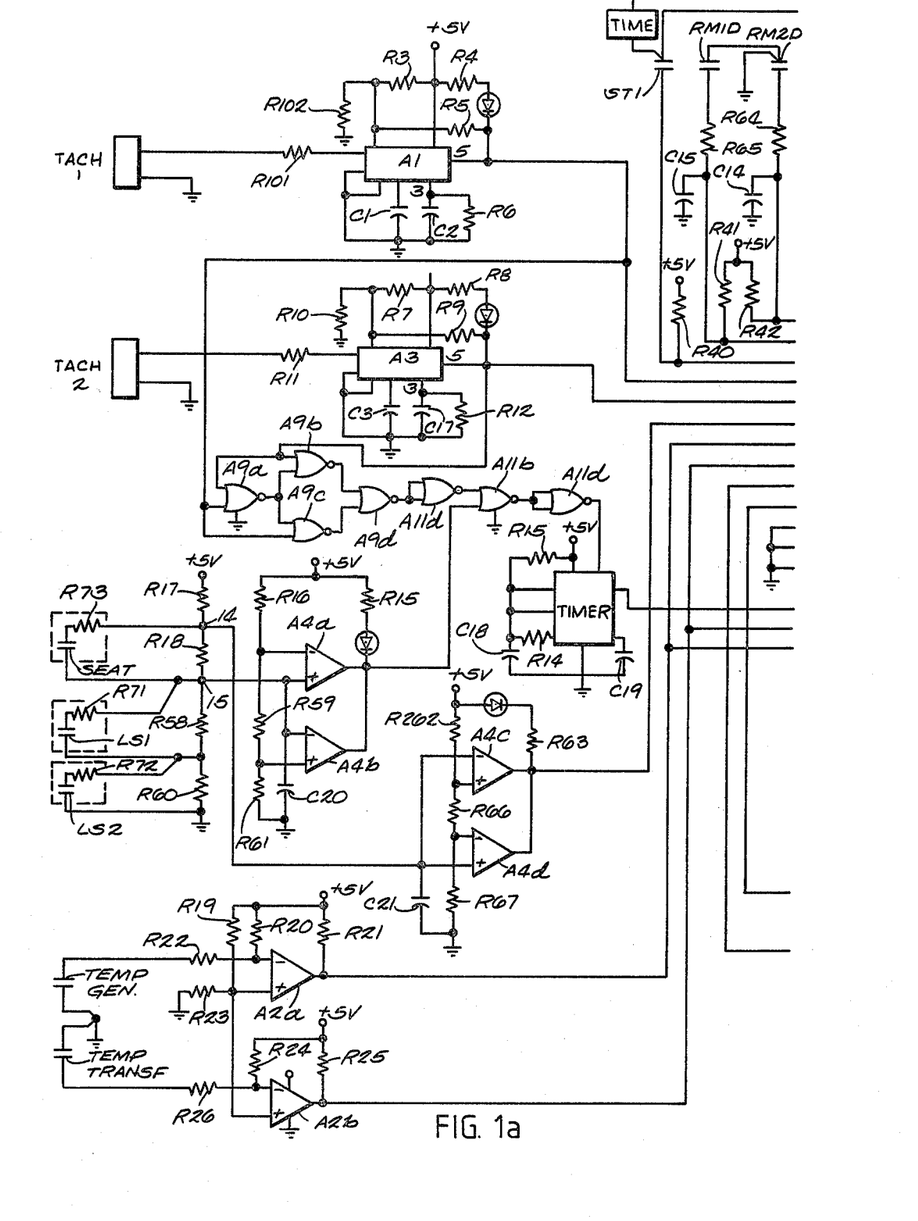
FIGS. 1a, 1b and 1c together comprise a circuit diagram of electrical weed destroying apparatus embodying the invention.
Figure 1B:
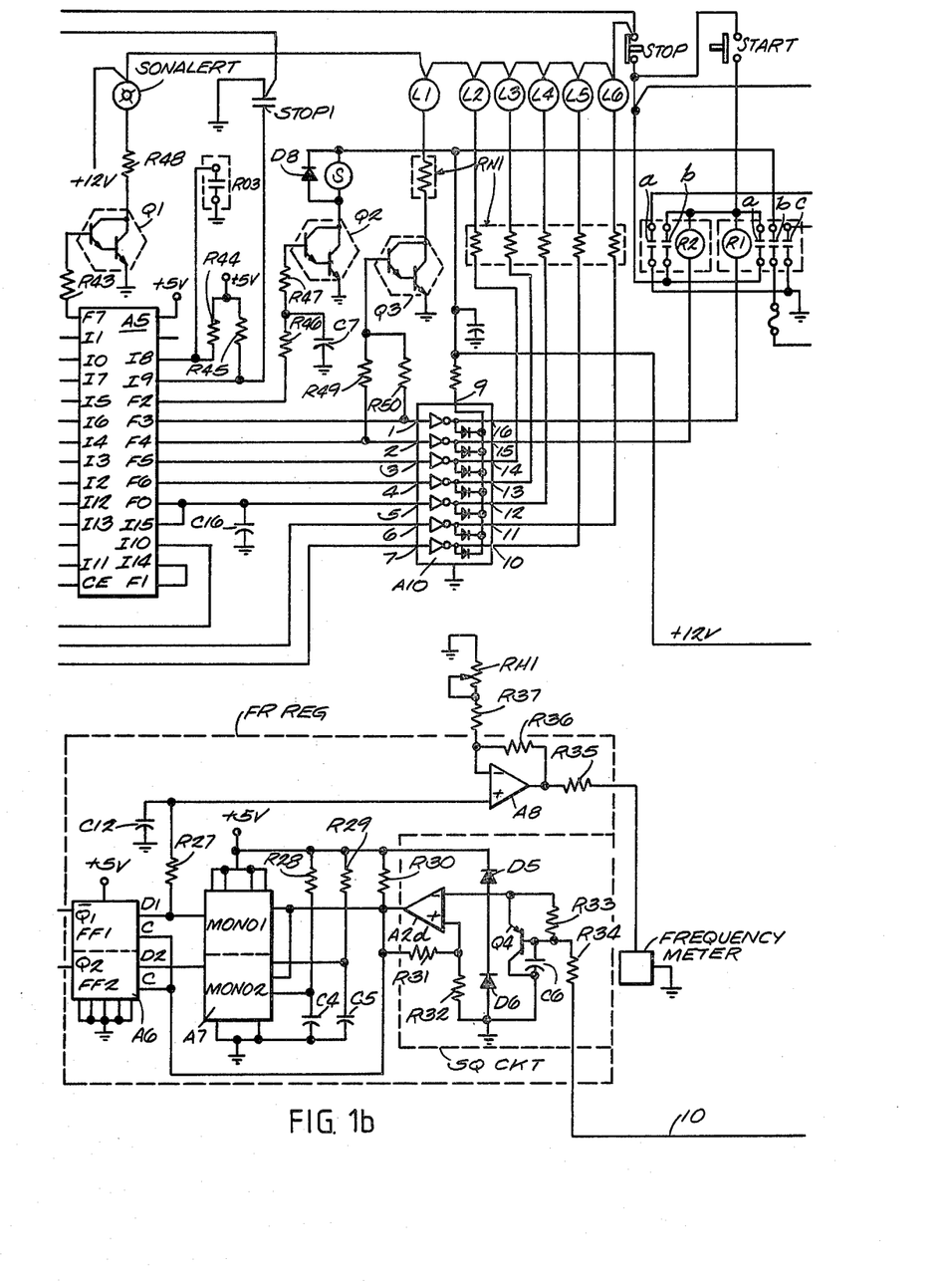
Figure 1C:
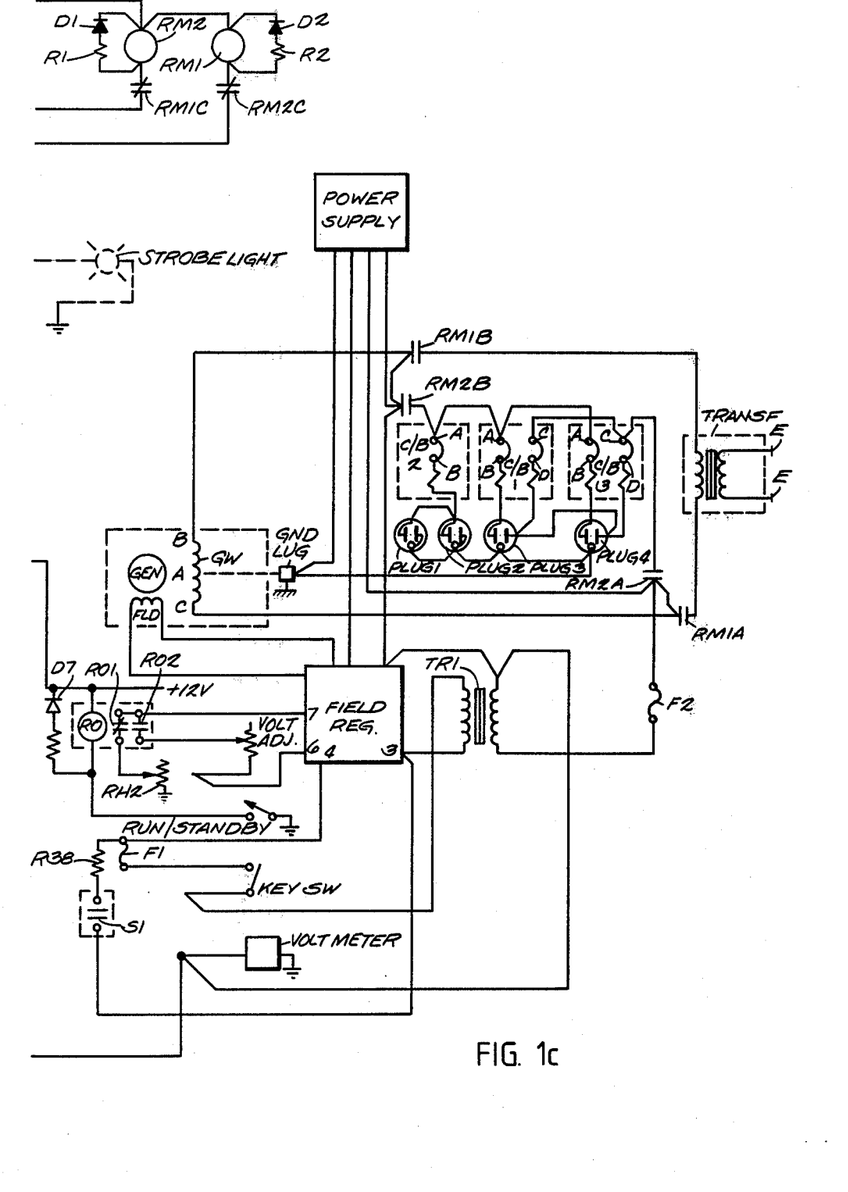

Referring to FIG. 1c, the weed destroying apparatus includes a suitable electrical generator GEN which may be driven by the power take-off shaft of a tractor and has an armature winding GW whose midtap A is connected to a ground lug GND LUG and whose ends B and C are respectively connected through the normally open contacts RM1B and RM1A of a main contactor RM1 to opposite ends of the primary winding of a step-up transformer TRANSF which increases the voltage so that a sufficiently high voltage, such as 14.4 kilovolts, is present at electrodes E (which are connected to the ends of the transformer secondary winding) to destroy any weeds that contact electrodes E. Main contactor RM1 is operated when the vehicle is traveling above a predetermined speed and all safety interlocks and sensors are operating normally (so that binary 1 voltage is present on the F3 output of logic array A5 as described hereinafter), and the vehicle operator pushes the START button switch to energize the coil of pilot relay R1.

R1 Operates

Closes its "a" contacts to latch itself to a regulated power supply +12 V through the STOP push button switch contacts;

Closes its "b" contacts to connect power supply +12 V to one side of a STROBE light whose other side is grounded; and Closes its "c" contacts to connect ground through normally closed contacts RM2C of an output contactor RM2 to one side of coil RM1 whose other side is connected through the STOP switch contacts to power supply +12 V.

The flashing STROBE light provides an immediately visible warning to bystanders that the apparatus is energized.

RM1 Operates

Closes contacts RM1A and RM1B to connect generator winding GW to the primary of transformer TRANSF; and Opens contacts RM1C to prevent operation of contactor RM2; and Closes contacts RM1D to connect ground (binary 0 voltage) to input I0 of the programmable semiconductor logic array A5 and thus indicate that main contactor RM1 is closed.

The conditions under which logic array A5 provides binary 1 voltage on its F3 output to permit operation of pilot relay R1 will be described hereinafter.

Figure 2:
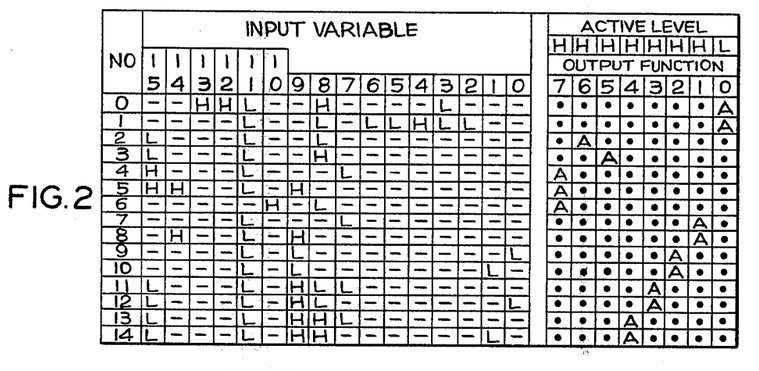
FIG. 2 is a program table for the semiconductor logic array used in the FIG. 1 apparatus.

Logic array A5 may be a bipolar field programmable semiconductor logic array such as the type 82S100 available from Signetics Corp., and the program table for A5 is shown in FIG. 2.

A normally open key switch KEY SW may be actuated by the vehicle operator to excite the field winding FLD of generator GEN (assuming that the speed of the generator rotor is sufficiently high). Closure of the KEY SW contacts connects the secondary winding of an isolating transformer TR1 through a fuse F1 to terminals 3 and 4 of a field regulator FIELD REG which, in response thereto, supplies DC voltage at its output terminals to excite the field winding FLD of the generator.

A RUN/STANDBY switch may be actuated by the vehicle operator to the closed RUN position when it is desired to destroy weeds or, alternatively, to an open STANDBY position when it is desired that the apparatus remain at rest and provide alternating current power at four outlets PLUG 1, PLUG 2, PLUG 3 and PLUG 4 to operate auxiliary farm equipment.

Weed Destroying Mode

In the weed mode the operator turns on the key switch to energize the generator and actuates the RUN/STANDBY switch to the closed RUN position. At this time only "interlock" light L4 will light, thereby indicating that one or more interlocks are not set for the weed mode. The operator can now lower the coulters in the ground and start the vehicle in motion while seated on the tractor seat, thereby closing coulter limit switches LS1 and LS2 and the SEAT switch. When the coulters start to turn and the speed sensors A1 and A3 sense that vehicle speed is above 0.6 miles per hour, "interlock" light L4 will turn off and the "run" light L3 will turn on. At this time the START button can be pushed to close main contactor RM1, thereby energizing electrodes E. The "on" light L1 will also light to indicate the system is running. Contactor RM1 will remain energized until the operator hits the STOP button or an interlock opens. If an interlock opens and causes main contactor RM1 to open, interlock light L4 will turn on, the "on" light L1 will turn off, the "run" light L3 turns off and a SONALERT alarm sounds.

In greater detail, the operator initially turns on the key switch KEY SW to energize terminals 3 and 4 of the field regulator FIELD REG of the generator from the 120 volt secondary winding of isolating transformer TR1. The primary winding of isolating transformer TR1 receives 220 volts from generator winding GW through a fuse F2. The operator then actuates the RUN/STANDBY switch to the closed RUN position which connects ground to one side of the coil of a relay RO whose other side is connected to the power supply +12 V.

Relay RO Operates

Opens its RO1 contacts to open the circuit to rheostat RH2;

Closes its RO2 contacts to connect the VOLT ADJ potentiometer across terminals 6 and 7 of the field regulator FIELD REG to thereby permit the operator to vary the generator voltage; and Closes its RO3 contacts to couple ground, or binary 0 voltage to input I8 of logic array A5.

If all interlocks are not in the safe position for the weed destroying mode, logic array A5 will provide binary 1 voltage on its F0 output to light interlock lamp L4. Assume, for example, that the operator is not sitting down so the SEAT switch is open. This will result in a binary 0 voltage from comparator A4c applied to input I4 of logic array A5, and the FIG. 2 program table shows that A5 can only provide a low (L), or binary 0 active level (A) on its F0 output to extinguish lamp L4 when input I4 is at binary 1 voltage (and inputs I2, I3, I5, I6, I8 and I11 are binary 0 voltage).

Output F0 of A5 is coupled to input pin 5 of a Darlington transistor array buffer amplifier A10 which, in response thereto, provides binary 1 voltage on its output pin 12 which is connected to one side of interlock lamp L4 through one element of a multiple resistance array RN1. A10 may be a silicon monolithic integrated circuit such as type MC1413 available from Motorola Inc. and is used to drive the panel lights and the pilot relays.

Grounding Coulter Interlocks

The weed killing apparatus utilizes redundant, i.e., two grounding coulters (not shown) which penetrate the ground to assure that the frame of the vehicle does not assume the high potential from the step-up transformer TRANSF and thus become a hazard to the operator or bystanders. Limit switches LS1 and LS2 are provided on the coulters to insure that both coulters are solidly grounded before transformer TRANSF can be energized. The apparatus de-energizes transformer TRANSF if either coulter does not penetrate the ground so the associated limit switch LS1 or LS2 is open.

Two comparators A4a and A4b sense whether coulter limit switches LS1 and LS2 agree or disagree. Two comparators A4c and A4d sense whether the operator's SEAT switch is open or closed and also detect whether either coulter limit switch LS1 or LS2 is open.

Four resistances R17, R18, R58 and R60 connected in series between a power source +5 V and ground form a voltage divider. The junction point 15 between R18 and R58 is connected: (a) in series with a resistance R71 and limit switch LS1 across R58, and (b) to the non-inverting input of comparator A4a which has a predetermined potential applied to its inverting input derived at the junction between resistances R16 and R59 of a voltage divider comprising resistances R16, R59 and R61 connected between source +5 V and ground; and (c) to the inverting input of a comparator A4b which has a predetermined voltage applied to its non-inverting input derived at the junction between R59 and R61. A resistance R72 is connected in series with limit switch LS2 across R60. A normally open SEAT switch is connected in series with a resistance R73 across R18. Junction point 14 between R17 and R18 is connected to: (a) the inverting input of a comparator A4c which receives a predetermined voltage on its non-inverting input derived at the junction between R66 and R63 of a voltage divider comprising three resistances R62, R66 and R67 connected between source +5 V and ground, and (b) the noninverting input of a comparator A4d which receives a predetermined voltage on its inverting input derived at the junction between R66 and R67.

When LS1, LS2 and the SEAT switch are open, or in the unsafe condition, the voltage at junction point 14 is higher than the predetermined voltages applied to comparators A4c and A4d whose outputs are commoned, so the binary 0 output voltage from A4c is coupled to input I4 of logic array A5, thereby providing: (a) binary 1 voltage on output F0 to effect lighting of interlock lamp L4 and (b) binary 0 voltage on output F3 to prevent operation of pilot relay R1. Output F0 of A5 is coupled to input I15 of A5, and it will be noted from FIG. 2 that A5 can only provide a high (H) binary 1 output active level (A) on F3 when input I15 is binary 0. When LS1 and LS2 and the SEAT switch are closed, or in the safe condition, the voltage at junction point 14 is: (a) lower than the predetermined voltage applied to A4c so it provides binary 1 voltage output; and (b) higher than the predetermined voltage applied to A4d so its output is also binary 1. The resulting binary 1 voltage from the commoned outputs of A4c and A4d is coupled to input I4 of logic array A5 to indicate both coulters penetrate the ground and the SEAT switch is closed, thus causing logic array A5 to provide binary 0 voltage (shown as low (L) active level (A) in FIG. 2) on the F0 output lead to turn off interlock lamp L4. The binary 0 from output F0 is coupled to input I15 of A5 so logic array A5 provides binary 1 voltage (shown as high (H) active level (A) in FIG. 2) on output F3 to permit operation of pilot relay R1.

If the operator should stand up, the SEAT switch would open, and the voltage at junction point 14 would again become higher than the predetermined voltages applied to A4c and A4d with the result that binary 0 voltage is applied to input I4 of logic array A5 to provide binary 1 on output F0 to thereby turn on the interlock lamp L4 and also provide binary 0 on output F3 to release pilot relay R1.

If either coulter comes out of the ground while the operator remains seated, limit switch LS1 or LS2 would open with the result that the voltage at junction point 14 would again become higher than the predetermined voltages applied to A4c and A4d, and binary 0 voltage output from A4c is applied to input I4 of logic array A5 to thereby turn on the interlock light L4 and release relay R1.

When both coulters penetrate the ground, LS1 and LS2 are closed, and the voltage at junction point 15 is lower than: (a) the predetermined voltage at the inverting input of A4a, so its output is binary 0 voltage and (b) the predetermined voltage at the non-inverting input of A4b, so its output is binary 1 voltage. The outputs of A4a and A4b are commoned and the resulting binary 0 voltage is coupled to one input of a NOR gate A11b so its output is binary 1 voltage. The output of A11b is inverted by gate A11d and applied to a TIMER which, in response thereto, provides binary 0 voltage to input I10 of logic array A5. Under such safe interlock conditions with input I10 at binary 0, output F7 of A5 is logic 0.

Comparators A4a and A4b sense whether limit switches LS1 and LS2 agree. If they do not, thereby indicating that one coulter has come out of the ground, a SONALERT horn is turned on which beeps at one second intervals. If either coulter should come out of the ground, one limit switch (e.g., LS1) would open, and the voltage at junction point 15 would become higher than the predetermined voltage applied to A4a so its output would become binary 1 voltage. The resulting binary 1 voltage is applied to gate A11b to change its output to binary 0 voltage. The output from A11b is inverted by gate A11d which provides binary 1 voltage to the TIMER which, in response thereto, provides binary 1 voltage pulses to input I10 of logic array A5. The binary 1 pulses on I10 result in intermittent binary 1 voltage pulses on output F7 of A5 which turn on a Darlington transistor array Q1. When Q1 turns on, ground is connected to one side of the SONALERT horn and causes it to beep.

Vehicle Speed Interlocks

In order to energize step-up transformer TRANSF, both grounding coulters must penetrate the earth, the operator must be in his seat, the vehicle must be traveling above a predetermined speed, for example, 0.6 mph, and the operator must push the START switch pushbutton. The requirement regarding vehicle speed insures that bystanders are not in the vicinity of the weed-destroying electrodes E when transformer TRANSF is energized. Vehicle speed may be sensed by tachometers TACH 1 and TACH 2 actuated by the vehicle wheels, or by the grounding coulters. Redundant tachometer interlocks are used to insure that a single unsafe condition, i.e., failure of a single safety interlock, does not create a hazardous condition. Further, failure of both tachometers to agree provides a aural indication to the operator so that it can be serviced.

TACH 1 and TACH 2 generate pulses at a frequency proportional to vehicle speed which are coupled through resistances R101 and R11 respectively to semiconductor frequency-to-voltage converters A1 and A3 which may be of the LM2907-8 type available from National Semiconductor Company. Frequency-to-voltage converters A1 and A3 include: (1) a coversion stage (not shown) which provides a DC voltage at pin 3 whose magnitude increases linearly with pulse frequency, and (2) a comparator stage (not shown) which compares the DC voltage on pin 3 to a predetermined voltage (established by the R102, R3 network of A1 and the R10, R7 network of A3) and provides binary 1 voltage on output pin 5 when the vehicle is at rest and flips the output on pin 5 to binary 0 voltage when the vehicle attains the desired 0.6 mph speed, thereby permitting energization of the weed-contacting electrodes E. The binary 1 voltage outputs from pins 5 of A1 and A3 when vehicle speed is less than 0.6 mph are coupled to inputs I5 and I6 respectively of logic array A5 and, as shown in the FIG. 2 program table, maintain: (a) binary 1 voltage (i.e. high (H) active level) on logic array output F0 to keep interlock lamp L4 lighted, and (b) binary 0 voltage on logic array output F3 to prevent operation of pilot relay R1.

When vehicle speed exceeds 0.6 mph, the outputs of A1 and A3 flip to logic 0 which is coupled to inputs I5 and I6. In response thereto, A5 provides: (a) binary 0 voltage on its F0 output to turn off the interlock lamp L4, and (2) logic 1 on its F3 output to permit operation of pilot relay R1.

NOR gates A9a, A9b, A9c, and A9d sense whether the outputs of the two speed sensors match and result in turning on intermittent SONALERT horn if they do not match. The output of A1 is coupled to one input of each NOR gate A9a and A9c, and the output of A3 is coupled to one input of each NOR gate A9a and A9b. The outputs of gates A9b and A9c are inputs to NOR gate A9d whose output is inverted by a NOT gate A11a. The output of A11a is coupled to one input of a NOR gate A11b whose output is coupled through a NOT gate A11d to input pin 4 of TIMER which provides a binary 0 output voltage to input I10 of logic array A5 when the vehicle is at rest.

When the vehicle speed is above 0.6 mph, the SEAT switch is closed, and both coulters are in the ground, the output voltages are as follows:

| | |
|---|---|
| A1 | 1 |
| A3 | 1 |
| A9a | 0 |
| A9b | 0 |
| A9c | 0 |
| A9d | 1 |
| A11a | 0 |
| A11b | 1 |
| A11d | 0 |
| TIMER | 0 |

Assume that TACH 2 becomes disabled. The output voltages change as follows:

| | |
|---|---|
| A1 | 1 |
| A3 | 0 |
| A9a | 0 |
| A9b | 1 |
| A9c | 0 |
| A9d | 0 |
| A11a | 1 |
| A11b | 0 |
| A11d | 1 |
| TIMER A12 | 1 (intermittent) |

The resulting binary 1 voltage pulses from TIMER are coupled to input I10 of logic array A5 and provide intermittent binary 1 voltage pulses from output F7 of A5 to NPN Darlington transistor array Q1, which turns on to intermittently supply ground to one side of the SONALERT horn whose other side is coupled to the power supply +12 V. This causes the SONALERT horn to sound intermittently and warn the operator that an unsafe condition exists.

Generator Temperature Interlock

If the temperature of the generator GEN becomes excessive, weed destroying operation is prevented. A temperature sensing switch embedded in generator GEN has a pair of normally open contacts TEMP GEN. One TEMP GEN contact is grounded and the other is connected through a resistance R22 to the inverting input of a comparator A2a whose inverting input normally sees +5 V volts through a resistor R20 and whose non-inverting input normally has +2.5 volts applied thereto derived from a voltage divider network R19, R23. Consequently the A2a output is normally binary 0 voltage and is coupled to input I3 of logic array A5. If the generator overheats to the extent that TEMP GEN contacts close, ground is applied through R22 to the inverting input of A2a so that its output becomes binary 1 voltage. This potential is coupled to input I3 of logic array A5, thereby changing: (a) its output F0 to binary 1 to turn on interlock lamp L4 and (b) its I15 input to binary 1 to thereby change its output F3 to logic 0 to release the pilot relay R1 and result in opening main contactor RM1. The binary 1 output from A2a is also coupled to input terminal 7 of A10 to light the "generator hot" lamp L5.

Transformer Temperature Interlock

Similarly weed destroying operation is prevented if the step-up transformer TRANSF overheats. A temperature sensitive switch embedded in transformer TRANSF has a pair of normally open contacts TEMP TRANSF one of which is grounded and the other is connected through a resistance R26 to the inverting input of a comparator A2b whose inverting input normally sees +5 volts though a resistor R24 and whose non-inverting input normally has +2.5 volts applied thereto from the R19, R23 network. Thus comparator A2b normally applies binary 0 voltage to input I2 of logic array A5, thereby permitting binary 0 voltage on its F0 output to turn off interlock lamp L4. If the transformer TRANSF overheats to the extent that TEMP TRANSF contacts close, ground is applied through R26 to the inverting input of comparator A2b so its output flips to binary 1 voltage which is coupled to input I2 of the logic array A5. This changes: (a) the logic array output F0 to binary voltage 1 to turn on interlock lamp L4, and (b) logic array output F3 to binary 0 voltage to release pilot relay R1 and thus open main contactor RM1. The binary 1 output from A2b is also coupled to input pin 6 of A10 to light the "transformer hot" lamp L6.

Interlock to Prevent Contactor Jamming

The weed destroying apparatus includes an interlock to prevent jamming of either main contactor RM1 or output contactor RM2 in the closed position. Usually pushing the STOP switch opens the latch-in circuits to pilot relays R1 and R2 to release the operated contactor. If the operator depresses the STOP button and the then-operated contactor RM1 and RM2 does not open, a fuse F1 is ruptured to reduce the generator output to zero and thus prevent a hazardous condition.

Assume that main contactor RM1 is closed when the operator depresses the STOP button to open the latch-in circuit to pilot relay R1 and release main contactor RM1. Depression of the STOP button closes contacts STOP-1 to connect ground, or binary 0, potential to input I9 of logic array A5 to thereby remove binary 1 voltage from output F3 of A5 and thus release pilot relay R1 and contactor RM1. De-energization of contactor RM1 should open its RM1D contacts and thus remove ground, or binary 0 voltage, from input I0 of logic array A5 and apply binary 1 voltage thereto through R41. However, if RM1 is jammed closed, input I0 will continue to see ground potential. Under such conditions (I0=0 and I9=0), logic array output F2 will go to binary 1 voltage (high (H) active level) to turn on NPN Darlington transistor array Q2 and connect ground potential to one side of the coil of the S relay, the other side of which receives +12 volts from the regulated power supply.

Relay S Operates

Closes its S1 contacts to connect fuse F1 in series with the KEY SW contacts and the secondary winding of isolating transformer TR1, thereby rupturing fuse F1 and de-energizing the field winding FLD of the generator to prevent the hazardous condition that would have resulted from RM1 jamming.

Standby Operation

The operator actuates the RUN/STANDBY switch to the open STANDBY position when it is desired that the apparatus remain at rest to provide alternating current power at four outlets PLUG 1, PLUG 2, PLUG 3 and PLUG 4 to operate auxiliary farm apparatus. Turning on the key switch KEY SW energizes generator GEN. The generator output voltage may be read upon a VOLT METER and may be adjusted by a rheostat RH2. In this condition, relay R0 is released and its contacts RO1 are open, with the result that binary 1 voltage from a power source +5 V is applied through a resistance R44 to input I8 of logic array A5. In response thereto, A5 provides: (a) binary 1 voltage (high (H) active level) on its F5 output which is coupled to input pin 3 of transistor array A10 which provides logic 1 on its output pin 14 to light STANDBY light L2 and thus indicate that the START button can be pushed to start the system.

Depression of START pushbutton switch couples the power source +12 V to one side of the operating coil of a pilot relay R2. Under these conditions logic array A5 is providing binary 1 voltage on its F4 output which is coupled to input pin 2 of A10, thereby completing an operating circuit from output pin 15 of A10 to the other side of the coil of R2. The binary 1 voltage on output F4 os A5 is also applied to a Darlington NPN transistor array Q3 which turns on to connect ground to one side of an ON lamp L1 to indicate that the system is running.

R2 Operates

Closes its "a" contacts to connect ground potential through normally closed contacts RM1C to one side of the operating coil of output contactor RM2; and Closes its "b" contacts to complete a latch-in circuit.

RM2 Operates

Closes its RM2A contacts to connect side C of grounded midtap generator winding GW to the C contacts of two circuit breakers C/B1 and C/B3;

Closes its RM2B contacts to connect side B of generator winding GW to the A contacts of C/B1, C/B3 and of a third circuit breaker C/B2;

Opens its RM2C contacts to open the circuit to main contactor RM1; and

Closes its RM2D contacts to connect binary 0 voltage through a resistance R64 to input I1 of logic array A5 to thereby indicate that output contactor RM2 is closed.

The middle terminal of each of four outlet sockets PLUG 1, PLUG 2, PLUG 3, and PLUG 4 is connected to ground potential at ground GRD LUG. These sockets are controlled by manual circuit breakers C/B1, C/B2 and C/B3. One side of PLUG 1 and of PLUG 2 is grounded, and the other side is connected through single pole breaker C/B2 and contacts RM2B to side B of the 220 volt grounded midtap generator winding GW so that 110 volt AC power is available at these outlets. Breakers C/B1 and C/B3 are of the double pole type, and one side of PLUG 3 and of PLUG 4 is connected through C/B1 and C/B3 respectively in series with contacts RM2B to side B of the 220 volt generator winding GW. The other side of these outlets is connected through C/B1 and C/B3 respectively in series with contacts RM2A to side C of the 220 volt generator winding GW so that 220 volt AC power is available at outlets PLUG 3 and PLUG 4.

Frequency Regulator

It is desirable that the frequency of generator voltage at outlets PLUG 1–PLUG 4 for operating auxiliary farm apparatus be maintained close to sixty cycles since electrical motors of such auxiliary apparatus may burn out if operated for long periods of time at frequencies substantially above or below sixty cycles. When the weed destroying apparatus is in the standby mode, a frequency regulator FR REG senses whether generator frequency is between 55 and 65 cycles and prevents connection of generator voltage to outlet PLUG 1– PLUG 4 if the frequency is beyond such range. Frequency regulator FR REG includes a squaring circuit SQ CKT which receives AC generator voltage over lead 10 from the secondary of isolating transformer TR1 and provides a square wave voltage of the same frequency to a precision dual monostable multivibrator A7 which may be of the type MC 14538 commercially available from Motorola Inc.

Generator voltage on lead 10 is coupled through a resistor R34 to the base of a PNP transistor Q4 of squaring circuit SQ CKT so Q4 is turned on and off by the negative and positive half cycles. The AC generator voltage is also coupled through a resistance R33 to the inverting input of a comparator A2d of the squaring circuit, and when the transistor Q4 is turned on during the negative half cycles, it in effect shunts the generator voltage to ground with the result that comparator A2d generates a series of positive pulses at generator frequency shown in FIG. 3a. Such square wave positive pulses from A2d are coupled to: (a) the trigger inputs of two monostable multivibrators MONO 1 and MONO 2 of dual unit A7 and which respectively measure 55 and 65 cycles per second; and (b) the clock (C) inputs of two type D flip-flops FF1 and FF2 of a dual flip-flop unit which may be of the type CD 4013 commercially available from RCA Corp.

The outputs of MONO 1 and MONO 2 are coupled to the D1 and D2 inputs of flip-flops FF1 and FF2 respectively. Monostable multivibrators MONO 1 and MONO 2 normally maintain logic 0 output and are triggered to logic 1 voltage output at the leading edge of each square wave pulse from squaring circuit SQ CKT and maintain such logic 1 voltage output for timing periods established respectively by R28, C4 and R29, C5. The $\overline{Q}_1$ output of flip-flop FF1 and the $Q_2$ output of flip-flop FF2 are coupled to the I12 and I13 inputs respectively of logic array A5. The rising leading edge of the square wave pulses from comparator A2d comprise clock pulses to the C inputs of flip-flops FF1 and FF2 which latch to (i.e., provide on their Q outputs) the logic voltage present on their D inputs when such clock pulses occur. Frequency regulator circuit FR REG thus clocks flip-flops FF1 and FF2 which sample the outputs of the corresponding monostable multivibrators MONO 1 and MONO 2 respectively at the leading edge of the square wave pulses from SQ CKT to determine whether or not the multivibrator has timed out during each generator frequency square wave pulse. The inputs from frequency regulator FR REG to logic array A5 vary as shown on the following table:

| Generator Frequency | Flip Flop Output | |
|---|---|---|
| | $\overline{Q}_1$ to I12 | $Q_2$ to I13 |
| 55 to 65 Hz (normal) | 1 | 1 |
| f > 65 Hz | 0 | 1 |
| f < 55 Hz | 1 | 0 |

Generator Frequency Between 55 and 65 Hz

Figure 3A:
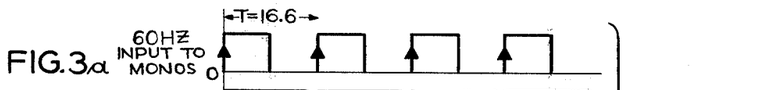
FIGS. 3a-3e illustrate pulses within the frequency regulator of the FIG. 1 apparatus when generator frequency is between 55 and 65 Hz.
Figures 3B, 3C:
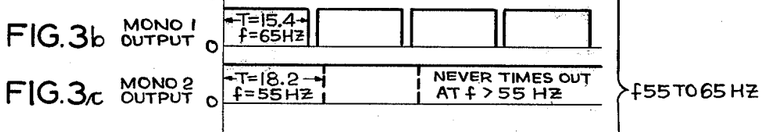
Figure 3D:
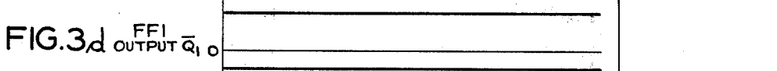
Figure 3E:
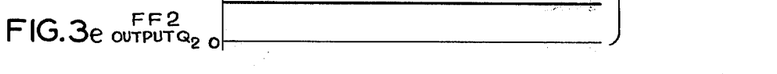

When generator frequency is between 55 and 65 cycles (assume 60 Hz), the timing output pulses of MONO 1 (which measure 65 cycles or 1000/65 = 15.4 milliseconds) shown in FIG. 3b are narrower than the (1000/60 = 16.6 millisecond) interval between clock pulses (at the leading edges of successive generator frequency square waves) shown in FIG. 3a. The D1 input of flip-flop FF1 is thus at logic 0 voltage when each clock pulse is received, and FF1 maintains (logic 0 in its $Q_1$ output and) logic 1 on its $\overline{Q}_1$ output shown in FIG. 3d which is coupled to the I12 input of logic array A5. The timing output pulses of MONO 2 (which measure 55 cycles or 1000/55 = 18.2 milliseconds) shown in FIG. 3c are wider than the (1000/60 = 16.6 millisecond) interval between clock pulses shown in FIG. 3a. Consequently, MONO 2 never times out, and the D2 input of FF2 is always at logic 1 voltage when each clock pulse appears, and FF2 maintains logic 1 voltage (See FIG. 3e) on its $Q_2$ output and the I13 input to logic array A5. As shown in FIG. 2, under such conditions logic array A5 provides logic 0 on its F0 output which is coupled to its I15 input to result in logic 1 voltage on its F4 output to operate pilot relay R2 and close contactor RM2 to connect generator voltage to outlets PLUG 1-PLUG 4.

Generator Frequency Greater than 65 Hz

Figures 3F, 3G:
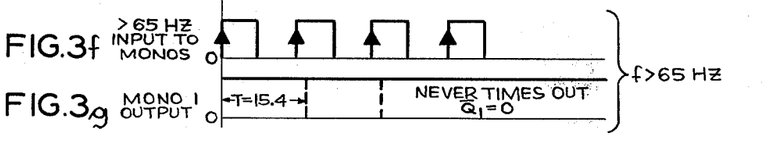
FIGS. 3f and 3g illustrate such pulses when generator frequency is above 65 Hz.

If generator frequency should become greater than 65 Hz as illustrated in FIG. 3f, the timing pulses of MONO 1 (which measures 65 cycles or 1000/65 = 15.4 millisecond) represented in FIG. 3g are wider than the interval between clock pulses represented in FIG. 3f. Consequently, MONO 1 never times out, and logic 1 voltage exists on the D1 input of FF1 each time a clock pulse appears. Flip-flop FF1 thus maintains logic 0 voltage on its $\overline{Q}_1$ load and input I12 to logic array A5, thereby providing logic 1 voltage on the F0 output of A5 as shown in the FIG. 2 table to turn on interlock light L4 and apply logic 1 voltage to input I15 which results in logic 0 voltage on the F4 output of logic array A5, thereby releasing pilot relay R2. Relay R2 opens its contacts to de-energize the coil of contactor RM2 which then releases and opens its RM2A and RM2B contacts to remove generator voltage from outlets PLUG 1-PLUG 4.

Generator Frequency Less Than 55 Hz

Figures 3H, 3I, 3J:
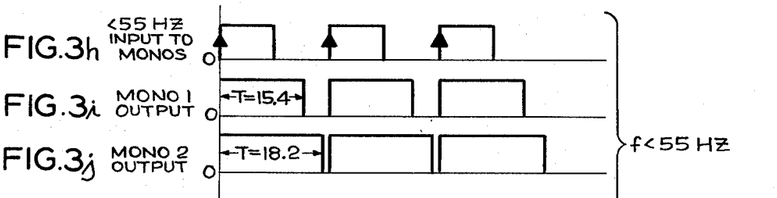
FIGS. 3h-3l illustrate such pulses when generator frequency is below 55 Hz.
Figures 3K, 3L:
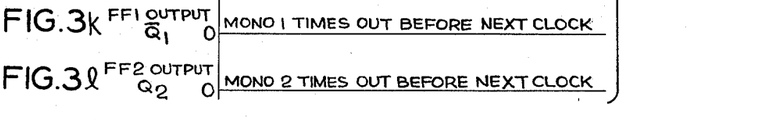

If generator frequency is less than 55 cycles as illustrated in FIG. 3h, the timing pulses of MONO 2 (which measures 55 cycles or 1000/55 = 18.2 milliseconds) represented in FIG. 3j are narrower than the interval between clock pulse at the rising edge of the generator frequency square wave pulses represented in FIG. 3h. Consequently, both MONO 1 and MONO 2 time out before the next clock pulse appear, and logic 0 voltage exists on the D2 input to FF2 when the clock pulse appears and FF2 maintains logic 0 voltage on its $Q_2$ output and on input I13 to logic array A5 as represented in FIG. 3l. The logic 0 voltage on input I13 results in logic 1 voltage in output F0 of A5 to light interlock lamp L4. The logic 1 voltage on output F0 is also coupled to input I15 of A5 and causes its F4 output to go to logic 0 voltage as shown in the FIG. 2 table, thereby releasing pilot relay R2 and contactor RM2 and disconnecting generator voltage from outlets PLUG 1-PLUG 4.

The embodiments of the invention in which an exclusive property or privilege is claimed are defined as follows:

1. In weed destroying apparatus carried on a vehicle and having electrodes (E) for contacting weeds adjacent rows of crops along which said vehicle travels, a source of high voltage electricity (GEN), an electrical contactor (RM1) for connecting said source to said electrodes, first and second safety systems each of which comprises redundant interlock means for preventing an unsafe condition in which said high voltage source (GEN) would be a hazard, sensor means associated with each said safety system (LS1, LS2, A4c, A4d; TACH 1, TACH 2, A1, A3) for providing binary signals indicative of whether said interlock means are in a safe or an unsafe condition, and means including a programmable semiconductor logic array (A5) receiving said binary signals on inputs thereof (I4, I5, I6) for preventing closure of said contactor (RM1) if any one of said interlock means is in said unsafe condition.

2. In weed destroying apparatus in accordance with claim 1 wherein said contact closure preventing means includes relay means (R1) coupled to a first output (F3) from said logic array (A5) for opening and for closing energizing circuits to said contactor (RM1), and wherein said logic array (A5) provides binary voltages on said first output (F3) to effect opening and closing of said relay means R1.

3. In weed destroying apparatus in accordance with claim 2 whereas said sensor means (LS1, LS2, A4c, A4d; TACH 1, TACH 2, A1, A3) provides said binary signals on first (I4) second (I5) and third (I6) inputs of said logic array (A5) and each of said first and second safety systems includes means (A4a, A4b; A9a, TIMER) for detecting when said redundant interlock means thereof agree or disagree and for supplying intermittent pulses to a fourth input (I10) of said logic array (A5) when they disagree, and a horn (SONALERT) coupled to a second output (F7) from said logic array (A5), and wherein said logic array (A5) is programmed to provide intermittent signals on said second output (F7) to sound said horn in response to said intermittent input pulses on said fourth input (I10).

4. In weed destroying apparatus in accordance with claims 1, 2 or 3 wherein said high voltage source includes an electrical generator (GEN) and a step-up transformer (TRANSF) having its secondary winding connected to said electrodes (E), and wherein said contactor (RM1) couples the output of said generator (GEN) to the primary winding of said step-up transformer (TRANSF), whereby when said vehicle is at rest no residual voltage is applied to said transformer which could be a hazard.

5. In weed destroying apparatus in accordance with claims 1, 2, or 3 wherein said redundant interlock means of said first safety system includes first and second grounding coulters and said sensor means associated therewith includes first and second limit switches (LS1 and LS2) associated with said first and second coulters respectively whose contacts are closed and are open respectively when said coulters penetrate and do not penetrate the ground.

6. In weed destroying apparatus in accordance with claim 5 wherein said first safety system sensor means includes a voltage divider (R17, R18, R58, R60) with said first and said second limit switches (LS1, LS2) each being connected in series with a resistance (R71, R72) across a portion (R58, R60) of said voltage divider, first and second comparators (A4c, A4d) having their outputs commoned and coupled to the first input (I4) of said logic array (A5) and with the inverting input of the first comparator (A4c) connected to the noninverting input of the second comparator (A4d) and to a first point (14) on said voltage divider, and means (+5 v, R62, R66, R67) for applying predetermined voltages to the noninverting input of the first comparator (A4c) and to the inverting input of the second comparator (A4d) which voltages are respectively above and below the voltage existing at said first point (14) on said voltage divider when both said limit switches (LS1, LS2) are closed.

7. In weed destroying apparatus in accordance with claim 6 as dependent from claim 2 and having seat interlock means on said vehicle including a switch (SEAT) connected in series with a resistance (R73) across a portion (R18) of said voltage divider and said predetermined voltage applied to said noninverting input of said first comparator (A4c) is above the voltage existing at said first point (I4) on said voltage divider when said first limit switch (LS1) and said second limit switch (LS2) and said seat switch (SEAT) are closed, and wherein opening of said first limit switch (LS1) or said second limit switch (LS2) or said seat switch (SEAT) raises the voltage at said first point (I4) above said predetermined potential applied to said noninverting input of said first comparator (A4c) and changes its output and the binary voltage from said commoned outputs of said first and second comparators (A4c, A4d) applied to said first input (I4) of said logic array (A5), said logic array (A5) being programmed to respond to said change of binary voltage on said first input (I4) and provide a binary voltage on said first output (F3) which operates said relay means (R1) in a direction to open said contactor (RM1).

8. In weed destroying apparatus in accordance with claim 6 and including a horn (SONALERT) coupled to a fourth output (F7) from said logic array (A5), timer means (TIMER) for applying intermittent pulses to a fourth input (I10) of said logic array (A5), sensor means for detecting whether said first limit switch (LS1) and second limit switch (LS2) agree or disagree and for energizing said timer (TIMER) when they disagree comprising third (A4a) and fourth (A4b) comparators having their outputs commoned and coupled to said timer means (TIMER), the noninverting input of said third comparator (A4a) being coupled to the inverting input of said fourth comparator and to a second point (15) on said voltage divider (R17, R18, R58, R60), and means (+5V, R16, R59, R61) for applying predetermined voltages to the inverting input of said third comparator (A4a) and to the noninverting input of said fourth comparator (A4b) which are above said voltage at said second point (15) when said first and second limit switches (LS1, LS2) are closed but are respectively above and below said voltage at said second point when said first and second limit switches disagree.

9. In weed destroying apparatus in accordance with claim 5 wherein said redundant interlock means of said second safety system includes first tachometer means (TACH 1) and second tachometer means (TACH 2) for providing a train of pulses whose frequency is a function of the speed of said vehicle, and said sensor means associated with said second safety system includes first and second semiconductor frequency-to-voltage conversion means (A1, A3) associated with said first and with said second tachometer means respectively for providing binary signals on second (I5) and third (I6) inputs to said logic array (A5) respectively indicative of whether the frequency of said train of pulses in above or below a predetermined value and that said redundant interlock means of said second safety system are in a safe or unsafe condition.

10. In weed destroying apparatus in accordance with claim 9 and including a horn (SONALERT) coupled to a fourth output (F7) from said logic array (A5), timer means (TIMER) for applying intermittent pulses to a fourth input (I10) to said logic array (A5), logic gate means (A9a–A9d) coupled to the outputs of both said first and said second frequency-to-voltage conversion means (A1, A3) for energizing said timer means (TIMER) when said outputs disagree, said logic array (A5) being programmed to provide intermittent binary voltages on said fourth output (F7) to sound said horn in response to said intermittent pulses from said timer on said fourth input (I10).

11. In weed destroying apparatus in accordance with claim 2 and including seat switch interlock means (SEAT) on said vehicle which is in a safe and an unsafe condition respectively when the vehicle operator is and is not sitting on the vehicle seat, sensor means (A4c, A4d) for providing binary signals on an input (I4) of said logic array (A5) indicative of whether said seat switch is in said safe or said unsafe condition, and wherein said logic array (A5) is programmed to provide a binary voltage on said first output lead (F3) to prevent operation of said relay means (R1) in a direction to close said contactor (RM1) if said binary signal on any of said inputs indicates that the corresponding interlock means is in said unsafe condition.

12. In weed destroying apparatus in accordance with claim 11 and including an interlock light (L4) coupled to a third output (F0) of said logic array (A5), and wherein said logic array is programmed to provide an output signal on said third output (F0) in turn on said interlock light (L4) when said binary signal on any of said inputs indicates that the corresponding interlock means is in said unsafe condition.

13. In weed destroying apparatus mounted on a vehicle and having electrodes (E) for contacting weeds adjacent rows of crops along which the vehicle travels, a source of high voltage electricity (GEN), a contactor (RM1) for connecting said source (GEN) to said electrodes (E), a programmable semiconductor logic array (A5), first and second safety interlock coulter means (LS1, LS2) for preventing said vehicle from assuming the potential of said source and being in the safe condition when said coulter means penetrate the ground, seat switch safety interlock means (SEAT) adapted to be closed and in the safe condition when the vehicle operator is sitting on the vehicle seat, sensor means (A4c, A4d) for providing binary signals to a first input (I4) to said logic array indicative of whether said coulter interlock means and said seat switch interlock means are in said safe or said unsafe condition, first and second tachometer safety interlock means (TACH 1, TACH 2) for detecting the speed of said vehicle and being in the safe condition when detected vehicle speed is above a predetermined magnitude, sensor means (A1, A3) for providing binary signals to second and third inputs (I5, I6) to said logic array indicative of whether said first and second tachometer safety interlock means are in said safe or said unsafe condition, and relay means (R1) coupled to a first output (F3) of said logic array (A5) for opening and for closing said contactor (RM1) in response to binary signals on said first output (F3), said logic array being programmed to provide a binary voltage on said first output (F3) to operate said relay means (R1) in a direction to close said contactor (RM1) only when all said binary signals on said inputs to said logic array indicate that the corresponding safety interlock means is in said safe condition.

14. In weed destroying apparatus in accordance with claim 13 wherein said sensor means for providing binary signals indicative of whether said coulter interlock means and said seat switch interlock means are in the safe or unsafe condition includes a voltage divider (R17, R18, R57, R58) having said seat switch (SEAT) coupled across a first portion (R18) thereof, first and second limit switches (LS1, LS2) associated with said first and second coulter interlock means respectively whose contacts are opened and closed respectively when said coulters penetrate and do not penetrate the ground and being coupled across second (R58) and third (R60) portions of said voltage divider respectively, and first and second comparators (A4c, A4d) having their outputs commoned and coupled to said first input (I4) to said logic array (A5) and having the inverting input of the first comparator (A4c) connected to the noninverting input of the second comparator (A4d) and to a point (14) on said voltage divider.

15. In weed destroying apparatus in accordance with claim 14 and including a horn (SONALERT) coupled to a second output (F7) from said logic array (A5), a timer (TIMER) for providing intermittent pulses to a fourth input (I10) to said logic array, and means (A4a, A4b) for detecting when said first and second limit switches (LS1, LS2) agree or disagree and for energizing said timer (TIMER) when they disagree, said logic array (A5) being programmed to provide voltage pulses on said second output (F7) to sound said horn in response to said intermittent pulse on said fourth input.

16. In weed destroying apparatus in accordance with claim 15 and including means (A9a-A9d) for detecting when said first and second tachometer safety interlock (TACH 1, TACH 2) agree or disagree and for energizing said timer (TIMER) when they disagree.

17. In weed destroying apparatus in accordance with claim 15 wherein said means for detecting when said first and second limit switches agree or disagree comprises third and fourth comparators (A4a, A4b) having their outputs commoned and having the non-inverting input of said third comparator (A4a) coupled to the inverting input to said second comparator (A4b) and to a second point (15) on said voltage divider; and logic gate means (A11b) coupled to the commoned outputs of said third and fourth comparator (A4a, A4b) for energizing and de-energizing said timer in response to the binary voltages at said commoned outputs.

18. In weed destroying apparatus in accordance with claim 15 and including an interlock lamp (L4) coupled to a third output (F0) of said logic array (A5), and wherein said logic array is programmed to provide a binary voltage on said third output (F0) to light said interlock lamp (L4) if any one of said binary signals on said inputs thereto indicate that the corresponding interlock safety means is in said unsafe condition.

19. In weed destroying apparatus in accordance with claim 15 wherein said high voltage source includes an electrical generator (GEN) and a step-up transformer (TRANSF) having its secondary winding connected to said electrodes (E), and wherein said contactor (RM1) couples the output of said generator (GEN) to the primary winding of said step-up transformer (TRANSF).

20. In weed destroying apparatus in accordance with claim 19 and including generator temperature safety interlock means which is in the safe and the unsafe condition respectively when the generator temperature is below and above a predetermined magnitude including means (TEMP GEN, A2a) for sensing the generator temperature and providing binary signals on a fifth input (I3) to said logic array (A5) indicative of whether said interlock generator temperature means is in the safe or the unsafe condition.

21. In weed destroying apparatus in accordance with claim 19 and including transformer temperature safety interlock means which is in the safe and the unsafe condition respectively when the transformer temperature is below and above a predetermined magnitude, and including means (TEMP TRANSF A2b) for sensing the transformer temperature and providing binary signals on a sixth input (I2) to said logic array (A5) indicative of whether said transformer temperature interlock means is in the safe or the unsafe condition.

22. Weed destroying apparatus carried on a vehicle and having electrodes (E) for contacting and killing weeds, a generator (GEN), a step-up transformer (TRANSF) having its secondary winding coupled to said electrodes (E), a programmable semiconductor logic array (A5) adapted to provide binary signals on a plurality of outputs (F1-F7) in accordance with the program entered therein and the binary instruction signals on its inputs (I1-I15), contactor means (R1-RM1) coupled to an output (F3) of said logic array (A5) for connecting said generator (GEN) to the primary winding of said transformer (TRANSF), and first and second safety systems each of which comprises redundant interlock means for preventing an unsafe condition in which the high voltage generated by said generator (GEN) and said transformer (TRANSF) would be a hazard, and sensor means associated with each said interlock means (LS1, LS2, A4c, A4d, TACH 1, TACH 2, A1, A3) for providing binary signals to inputs of said logic array (A5) indicative of whether said interlock means is in the safe or the unsafe condition.

23. Weed destroying apparatus in accordance with claim 22 and including a horn (SONALERT) coupled to an output (F7) of said logic array (A5), timer means (TIMER) coupled to an input (I10) of said logic array for applying intermittent pulses thereto, means (A4a, A4b) associated with said first safety system for detecting whether the redundant interlock means thereof (LS1, LS2) agree or disagree and for operating said timer means when they disagree, and means (A9a–A9d) associated with said second safety system for detecting whether the redundant interlock means thereof (TACH 1, TACH 2) agree or disagree and for operating said timer means when they disagree.

24. Weed destroying apparatus in accordance with claim 22 or 23 and including an interlock light (L4) coupled to an output (F0) of said logic array (A5).

25. Weed destroying apparatus in accordance with claim 22 or 23 and including switch means (RUN/STANDBY, R0) for selectively applying binary signals to an input (I8) to said logic array (A5) indicative of whether said apparatus is to operate in the weed killing mode.

26. Weed destroying apparatus in accordance with claim 22 or 23 wherein said redundant interlock means of said first safety system includs first and second grounding coulters and said sensor means associated therewith includes first and second limit switches (LS1, LS2) associated with said first and second coulters respectively whose contacts are closed and are open respectively when said coulters penetrate and do not penetrate the ground.

27. Weed destroying apparatus in accordance with claim 26 wherein said sensor means associated with said first safety system also includes a voltage divider (R17, R18, R58, R60) and first (A4c) and second (A4d) comparators having their outputs commoned and coupled to an input (I4) of said logic array (A5), said first limit switch (LS1) being coupled across a first portion (R58) of said voltage divider and said second limit switch (LS2) being coupled across a second portion (R60) of said voltage divider, and wherein a point (14) on said voltage divider is connected to the inverting input of one of said comparators (A4c) and to the noninverting input of the other comparator (A4d).

28. Weed destroying apparatus in accordance with claim 27 wherein said weed destroying apparatus also includes a seat interlock comprising a seat switch (SEAT) having contacts coupled across a third portion (R18) of said voltage divider and which contacts are closed when the operator is sitting on the seat of said vehicle, means (+5V, R62, R66, R67) for applying predetermined voltages to the noninverting input of said one comparator (A4c) and to the inverting input of said other comparator which are above the voltage at said point (14) on said voltage divider when said first (LS1) and second (LS2) limit switches and said seat switch (SEAT) are closed, and wherein opening of said first limit switch (LS1) or said second limit switch (RS2) or said seat switch (SEAT) raises the voltage at said point above said predetermined voltage applied to the input of one comparator and changes the binary voltage at the commoned outputs of said first and second comparators (A4c, A4d) applied to said input (I4) of said logic array.

29. Weed destroying apparatus in accordance with claim 26 wherein said redundant interlock means of said second safety system includes first tachometer means (TACH 1) and second tachometer means (TACH 2) for providing trains of pulses whose frequency is a function of the speed of said vehicle and said sensor means associated therewith includes first and second voltage-to-frequency conversion means (A1, A3) associated with said first and with said second tachometer means respectively for providing binary signals on inputs (I5, I6) to said logic array (A5) indicative of whether the frequency of said train of pulses is above or below a predetermined value.

* * * * *